Nov. 25, 1958 C. H. EVANS 2,861,538

INDICIA SETTING DEVICE

Filed Nov. 29, 1955

INVENTOR.

Charles Howard Evans

BY

Hal H McCaghen

Atty 2,861,538

INDICIA SETTING DEVICE

Charles Howard Evans, Lake Worth, Fla.

Application November 29, 1955, Serial No. 549,797

2 Claims. (Cl. 116—133)

This invention relates to indicia setting devices, and more particularly is directed to manually operable future mileage indicators.

Many vehicle operators mentally note the distance to the next town and the future odometer reading for the next town. Too frequently, however, the future odometer reading is forgotten.

Accordingly, an object of this invention is to provide a manually settable indicator for the future speedometer reading of next succeeding destination.

Another object of this invention is to provide a device of the class described which can be set by feeling without seeing the indicator.

A further object of this invention is to provide a device of the class described having a plurality of disengageable indicia discs with one of said discs being a driving element and another of said discs being a driven member.

A still further object of this invention is to provide a device of the class described which will be simple and economical in construction, and efficient and durable in use.

The foregoing, and other objects and advantages of this invention, will be more apparent from reading the following specification, in connection with the drawings forming a part thereof, wherein.

Figure 1:
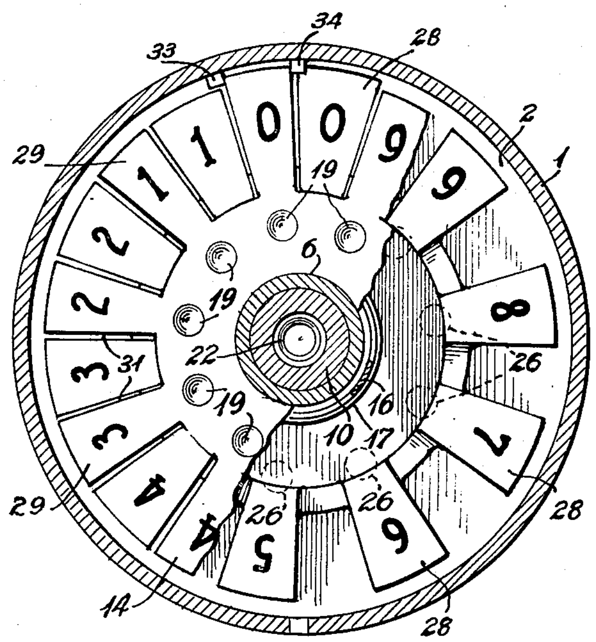
Fig. 1 is a partially broken face view of the indicator discs in their housing.
Figure 2:
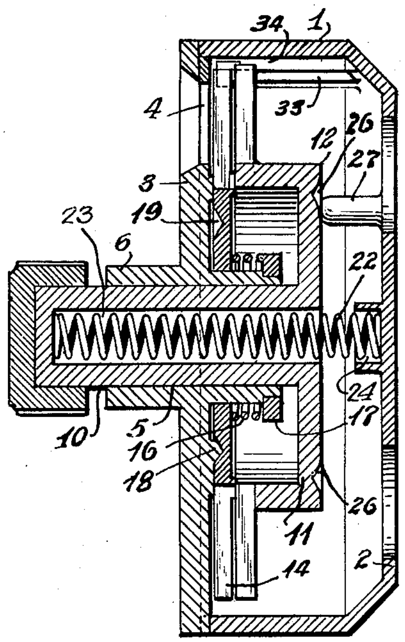
Fig. 2 is a cross-sectional view along the longitudinal axis of the device, with the indicia discs out of engagement.
Figure 3:
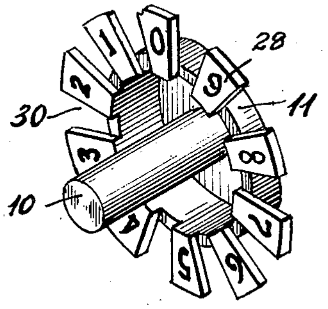
Fig. 3 is a perspective view of the driving indicia disc and driving shaft; and, Fig. 4 is a partial sectional view, parts in elevation, similar to Fig. 2, showing the indicia disc engaged.

Referring to the drawings, wherein like members are given the same reference numeral, a cylindrical housing 1 has a back member 2, preferably cast integral therewith of any suitable material such as synthetic resin. A face member or cover 3 is provided for the housing 1 and secured thereto in any suitable manner such as threaded engagement, plastic welding, gluing and the like. The cover 3 is provided with a view space 4, either a transparent window in an opaque cover or lined view space on a transparent cover, as will be explained more fully hereinafter. The cover 3 is provided with a central circular aperture 5, having a hollow boss 6 extending on each side of the cover to form a guide bearing.

Rotatably and slidably mounted in the aperture 5 is a setting shaft 10, to which is fastened a driving indicia disc 11; said fastening means illustrated as an angle member 12, or flange having a projection thereon, cast integral with the shaft 10 and having the disc 11 plastic welded thereto.

Rotatably mounted on the boss 6 inside the cover 3 is the driven indicia disc 14. The driven disc 14 is urged toward the cover 3 by resilient means, such as the illustrated coil spring 16 compressed between the driven disc

14 and a flange or ring 17 on the inner end of the boss 6.

The driven disc 14 is held spaced from the cover 3 by projection 18 on the cover 3. The projection 18 is spaced to alternately and successively engage each of ten equi-distant radially positional recesses 19 on the face of the driven disc 14.

The driving disc 11 is also urged towards the cover 3 by resilient means, such as the illustrated coil spring 22 received by an axial cavity 23 in the shaft 10 and a hollow boss on the housing back member 2. This disc 11 also has ten radial recesses 26 spaced equi-distant, as illustrated on the angle member 12. These recesses 26 alternately and successively partially receive a projection 27 on the housing back member 2 when the shaft 10 is moved inwardly of the housing.

Figure 4:
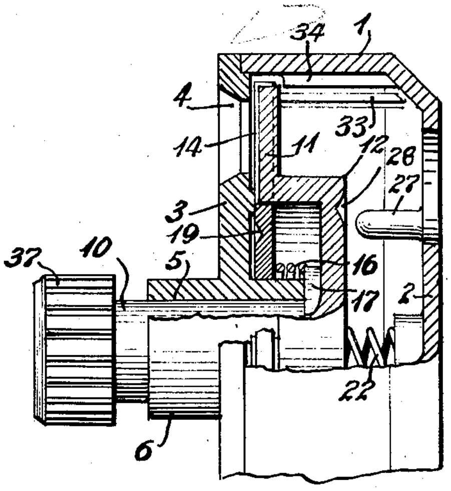

The driving disc 11 and driven disc 14 are releasably engaging. The engaging means are provided by having ten projections 28 and 29, respectively, on each, numbered 0 to 9 successively, radially aligned with said recesses 19 and 26 respectively, and channels 30 and 31, respectively, between said projections 28 and 29, to receive the said projections of the other disc, see Fig. 1. The "0" projections of each disc 11 and 14 is longer than the other numbered projections, to abut stop members 34 and 33, respectively, on the housing 2 to align the "0" in the view space 4; and, the "0" projection of disc 11 is shorter than the "0" projection of disc 14 to clear stop 33 and abut stop 34, which is thicker, see Fig. 4.

The stop member 33 abuts the "0" projection of the driven disc 14 when it is rotated counter-clockwise to position the "0" in the view space 4; but does not stop the "0" projection of disc 11. The stop member 34 is positioned inwardly in the housing from the cover 3 the thickness of the disc 14, and abuts the "0" projection of the driving disc 11 when it is rotated counter-clockwise, after disengagement of projections 28 and 29, to position the "0" in the view space. A knob 37 is fastened to the shaft 10 for rotating it easily.

In operation, the device is quite simple. The spring 22 engages the projections 28 and 29 in abutting relationship. By rotating the knob 37 counter-clockwise, the disc 11 rotates the disc 14 until the "0" of projection 29 abuts the stop 33. When the knob 37 is pushed in against the action of spring 22, it disengages the projections 28 and 29 so that rotation of the knob 37 in a counter-clockwise direction rotates only disc 11 until the "0" of projection 28 abuts the stop 34, thus placing both "0" projections in the view space 4.

Assuming that the odometer reading of an automobile is 6054 and the next town is 37 miles away, the odometer should read 6091 when that town is reached on the trip. Turn the knob clockwise, feeling the projection 16 top the recesses 19 nine times and the "9" projection of driven disc will be in the view space 4. Push the knob 37 in and turn counter-clockwise until the "0" of projection 28 abuts the stop 34. Then turn clockwise one "click" of the projection 27 contacting the recesses 26, the "1" of projection 28 is in the view space giving a reading of "91."

The device can be secured to the dash of an automobile or other convenient location, in a suitable manner, such as rubber suction cup, screw, plastic welding and the like.

The invention has been described in detail, but it is understood that the invention is not so limited, as many changes and modifications can be made therein without departing from the spirit and scope of the invention defined in the appended claims.

Having thus described the invention, what is claimed is:

1. An indicia setting device comprising a housing, a fixed front cover on said housing, a boss extending inwardly from said cover, said boss having bearing means at its inner end, a setting shaft perpendicular to said cover extending through said boss and rotatably and slidably mounted therein, a grippable portion on the outer end of said shaft for rotating and sliding it, a first disc on the inner portion of said shaft rigidly fixed thereto, a plurality of radial extensions equally spaced around the periphery of said disc, a second disc rotatably mounted on said boss coaxially with said first disc between said cover and said first disc, resilient means between said bearing means and said second disc urging the latter against said cover, a plurality of radial extensions equally spaced around the periphery of said second disc, all said radial extensions being of equal angular width measured around the axis of said shaft, said discs having matching configurations permitting them to be meshed with each other in an axially outward position of said setting shaft and said first disc with all said radial extensions lying in the same plane and the radial extensions of each disc fitting in the spaces between the radial extensions of the other disc, so that in said outward position said setting shaft may be turned to rotate all said radial extensions together, resilient means between said housing and said setting shaft urging said discs into meshed relationship, said setting shaft and said first disc having an inward position in which said discs are unmeshed so that said first disc and its radial extensions may be rotated without rotating said second disc and so that said first disc may be remeshed with said second disc in another selected rotated position, the front of each said radial extension having indicia thereon, the indicia on each disc being arranged seriatim on successive radial extensions, said cover having a view opening exposing indicia on each of said discs, whereby in said outward position all said indicia may be rotated to bring a selected indicium on said second disc into view through said viewing opening, and said setting shaft may be shifted to its inward position and then rotated to bring a selected indicium on said first disc into view beside said selected indicium on said second disc.

2. An indicia setting device in accordance with claim 1 having, in combination, means for selectively setting said indicia without visual observation, comprising a first fixed stop on said housing engaging a first abutment on said second disc when it is rotated in one direction to bring a certain one of the indicia thereon into view through said viewing opening, a second fixed stop on said housing engaging a second abutment on said first disc when it is rotated in said one direction while in its said inward position to bring a certain one of the indicia thereon into view through said viewing opening, cooperating detent means on said second disc and said cover for sensibly engaging each other each time one of the indicia on said second disc is brought into view through said viewing opening, and cooperating sensing means on said first disc and said housing for sensibly engaging each other each time said first disc, while held inwardly as far as it will go, is rotated to a position in which one of its indicia is brought into view through said viewing opening.

References Cited in the file of this patent

FOREIGN PATENTS 137,190 Great Britain ------------ Jan. 8, 1920